United States Patent [19]

Bailey et al.

[11] 4,423,416

[45] Dec. 27, 1983

[54] DECODER FOR TRANSMITTED MESSAGE DEACTIVATION CODE

[75] Inventors: David F. Bailey, Plantation; Merle L. Gilmore, Ft. Lauderdale; Charles J. Ganucheau, Jr., North Lauderdale, all of Fla.; Gary W. Clow, Sierra Madre, Calif.

[73] Assignee: Motorola, Inc., Schaumburg, Ill.

[21] Appl. No.: 310,594

[22] Filed: Oct. 13, 1981

[51] Int. Cl.³ .................... H04Q 9/00; H04Q 7/00; H04M 11/02

[52] U.S. Cl. ..................... 340/825.52; 340/825.44

[58] Field of Search .............. 340/825.52, 825.44, 340/825.76; 179/2 EC; 455/70, 54, 53, 49, 48

[56] References Cited

U.S. PATENT DOCUMENTS 4,178,476  12/1979  Frost .................... 340/825.44

Primary Examiner—Donald J. Yusko
Attorney, Agent, or Firm—Philip R. Wadsworth; Joseph T. Downey; James W. Gillman

[57] ABSTRACT

A decoder for receiving a transmitted message followed by a digital deactivation code is described. To prevent unnecessary utilization of a broadcast channel, the decoder responds to a digital deactivation code received at the end of a variable length analog or digital message.

25 Claims, 7 Drawing Figures

FIG. 1

DECODER FOR TRANSMITTED MESSAGE DEACTIVATION CODE

BACKGROUND OF THE INVENTION

The concept of squelch is to automatically quiet or mute a radio receiver in response to a specified input signal characteristic and circuits for providing this operation are well known in the art. In high gain receivers the speaker noise produced by the absence of carrier on a given frequency can be very annoying to an operator. Normally such squelch circuits continuously monitor for a presence of an RF signal or carrier. When no signal is detected the squelch circuit is activated and the audio channel becomes inoperative.

One of the principal difficulties with such detection systems is that they require constant monitoring for the detection for the presence of a carrier and can cause a substantial power drain. When applied to a paging receiver system with a large number of pagers with a correspondingly high message traffic rate, the transmitter carrier signal may never be shut down because of the volume of traffic. Therefore the absence of a carrier would never be detected so that such squelch circuits could not operate correctly. A further difficulty is that the usual analog circuitry to achieve squelch requires some period of time to confirm detection and activation. Thus there frequently occurs a tailing off of the audio channel. The deactivation control word of the present invention operates to selectively squelch the paging receiver which has been selectively addressed. Thus, only the pager which has been correctly addressed and received the message undergoes deactivation.

The use of a deactivation control word for achieving this function with respect to a paging system has the distinct advantage that not only can the voice channel and thus the operator reception be clear of the annoying noise sound but it permits messages to be more tightly packed and thus increase the message throughput.

In the system of the preferred embodiment, the coding format to achieve paging is digital in nature and therefore the coding signal which is utilized to provide the deactivation control is itself a digital signal. Thus the squelch operation of the paging receiver has the same sensitivity as for normal the paging. The use of a digitally encoded word to achieve squelching in such a circuit provides the many advantages. The use of a positive deactivation control word at the conclusion of a variable length audio message provides utilization of the now wanted normal time out allocated for fixed length message systems and allows a more tightly packed message arrangement, thus increasing throughput for the entire system.

SUMMARY OF THE INVENTION

It is an object of the present invention to provide an improved decoder for transmitted coded information.

It is a further object of the invention to provide a decoder which responds to deactivation code signals to terminate processing of coded information.

A decoder for a receiver in a plural population of receivers for receiving transmitted coded information signals comprising means responsive to received coded signals designating the address of an individual receiver in said plural population of receivers means responsive to the detection and decoding of an address of an individual pager receiver for establishing the processing of transmitted coded information signals and means responsive to detected deactivated code signals to terminate the processing of coded information signals.

BRIEF DESCRIPTION OF THE DRAWINGS

FIGS. 1 A-C timing diagrams for the encoded message system for the present invention.

DESCRIPTION OF THE PREFERRED EMBODIMENT

Figure 1:
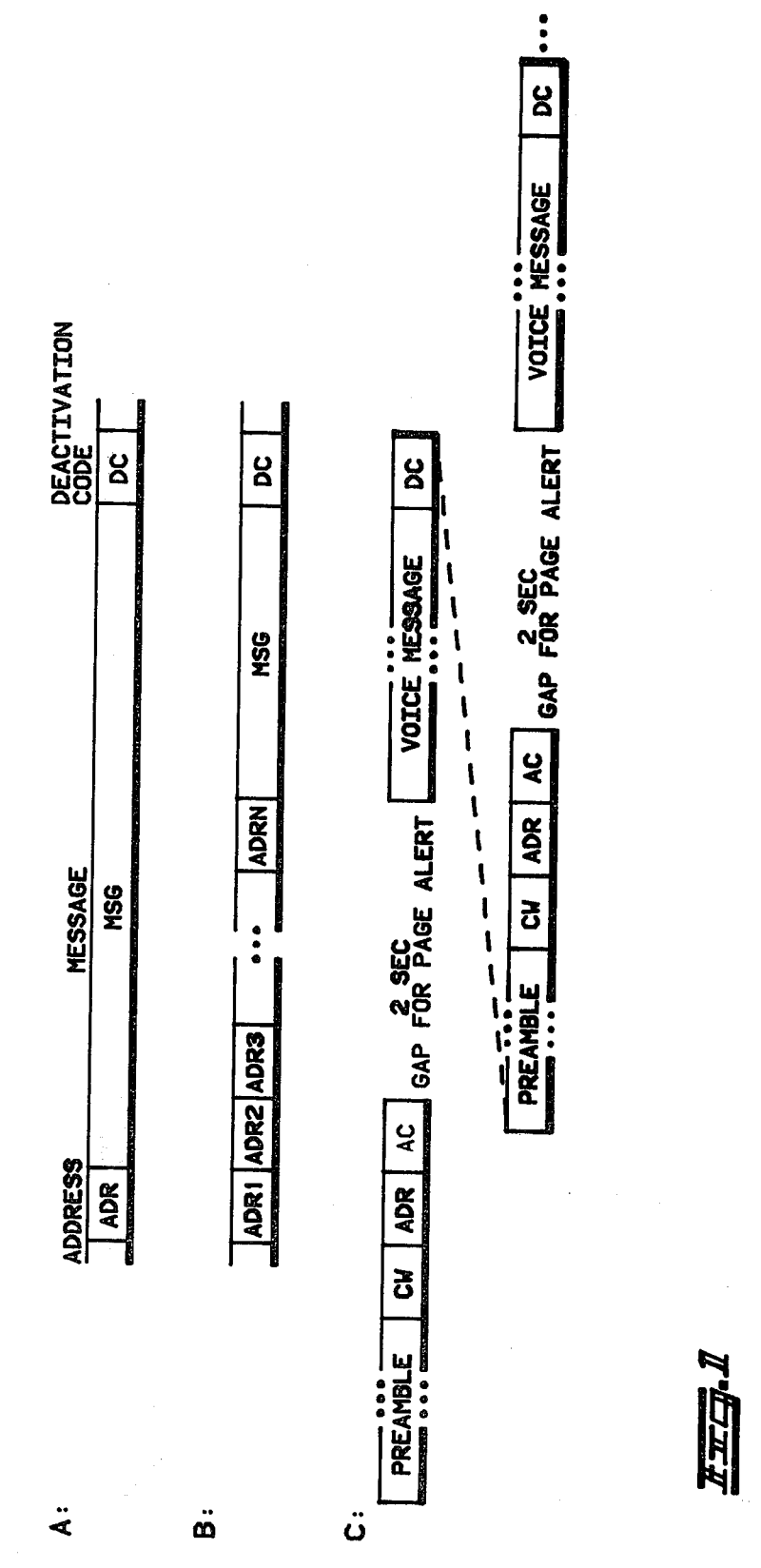
Figure 2:
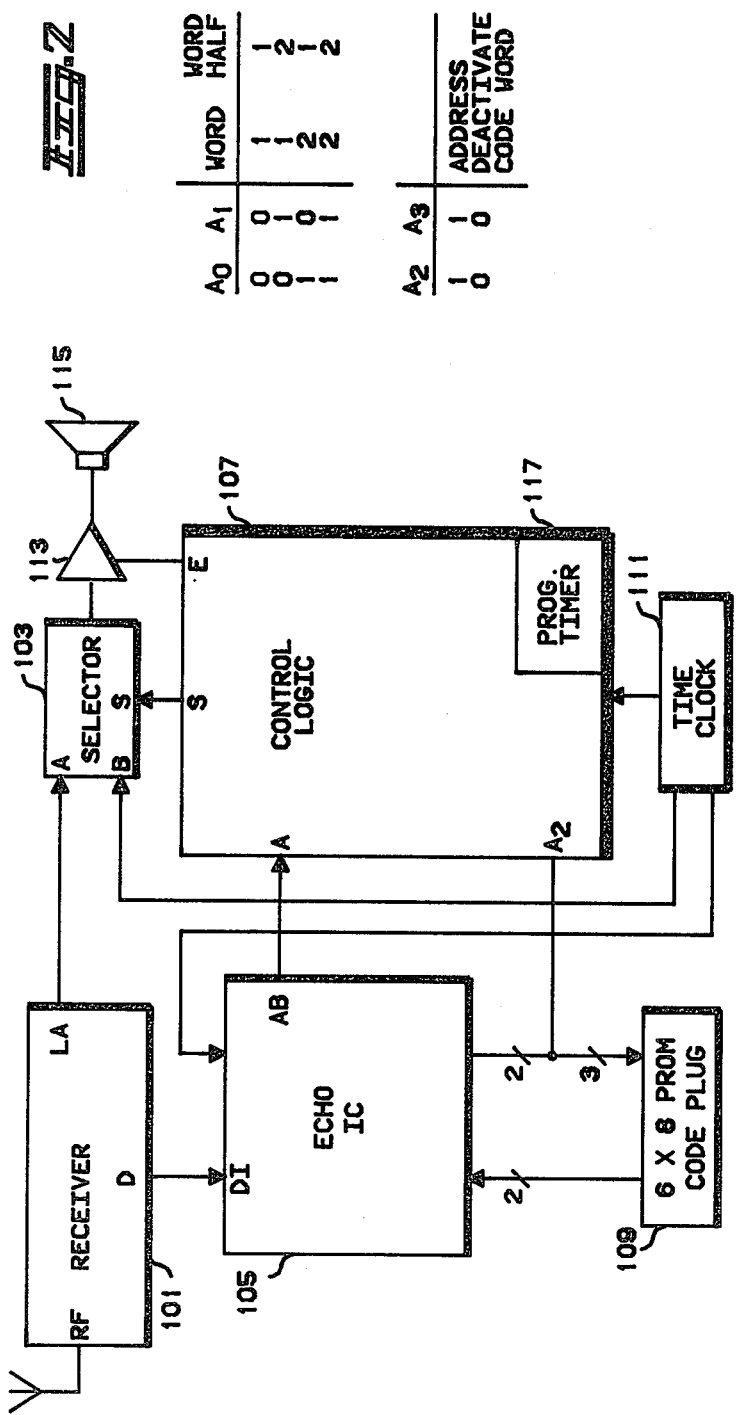
FIG. 2 is a functional block diagram of a hardware embodiment of the present invention.

FIG. 1 is a timing diagram depicting the use of a deactivation control word in conjunction with a message system. FIG. 1A shows in time sequence extending from left to right that an individual receiver is addressed from a transmitter terminal and at the conclusion of the address the receiver is actuated to receive a message. The message is generally a voice message and during the first portion of which there is an alert time followed by a real time or otherwised modified voice signal which could also include data information. It is assumed a priory that the message to be sent by such a terminal system can be of variable length.

It is well know in the art that when such message systems provide a fixed length period that frequently the entire fixed time is not used thereby causing a waste of system time and a resultant diminishment of the the number of messages per unit time that can be handled by the system. At the conclusion of the message portion there is included as shown in FIG. 1A a deactivation control signal which for the preferred embodiment is a digital word which causes the individually addressed receiver and only that receiver to disable the audio channel so that there is no disturbance to the receiver in the form of carrier or other background noise and ensure that the broadcast transmitter can then be immediately used for addressing additional receivers. The advantages of such a deactivation code are that the variable length messages can be positively terminated with the same distinction as the initial activation of a receiver upon a receipt of its correct address.

FIG. 1B shows a variant form of the use of the deactivation code signal in which a plurality of addresses of individual receivers may be sequenced together in the form a batch. At the conclusion of the last address in the batch the message is commenced and at the conclusion of the message the deactivation control word operates to terminate the audio operation of all of the previously addressed receivers. In FIG. 1B it is tacitly assumed that the number of receivers that constitute such a batch would effect the message duration in that if there were an alert time which were to be part of the message operation that sufficient time have to be allocated so that the receiver user of the last addressed receiver would have sufficient alerting time for the message. At the conclusion of the variable length message as in the case of voice, all of the addressed receivers would have the audio channel turned off by a reception of the deactivation control word thus the broadcast channel would immediately become available for additional message transmission.

While it is clear that many types and formats of signal coding may be utilized for the present invention the preferred embodiment utilizes a digital signal system designated as the Golay Sequential code. The Golay Sequential Code (GSC) is a selective call paging protocol based largely on the current Golay binary paging format. A full description of the Golay code may be found in a paper entitled "Selectively Signalling for Portable Applications" by Leonard E. Nelson, 28th IEEE Vehicular Technology Conference, Denver, Colo., Mar. 22–24, 1978. The Golay Sequential Code is an NRZ binary signaling format that has been greatly modified from an earlier format to accommodate intermixed tone only, tone and data, as well as tone and voice paging and now improved battery saving.

The GSC is an asynchronous paging format which allows pages to be transmitted individually or in batches. Maximum message throughput for tone only and tone and data pages is achieved in the batch transmission mode; while the individual call mode is useful in tone and voice paging.

The single cell address format consists of a preamble, a control word, an address code, and for voice paging, an Activation Code (AC). The preamble serves to divide papers within the system into groups for improved battery life, as well as to uniquely identify GSC transmissions from other coding schemes to facilitate channel sharing without sacrificing battery life or false call integrity. The control word delimits the end of the preamble and it supplies timing information for the batch mode decoding. The address uniquely identifies each pager and the AC is used to control the pager audio circuits in voice paging. The batch mode of operation allows a string of addresses to be transmitted following the control word.

A data message consists of an address followed by one or more data blocks. Data messages may be transmitted individually in the single cell mode or intermixed with address only pages in the batch mode of transmission. Address and data blocks are exactly the same length. The address information is constructed from words selected from the Golay (23, 12) cyclic code while the data information is encoded using the (15, 7) BCH code. Address information is transmitted at 300 bits/second while data information is transmitted at 600 bits/second.

In addition to enabling pagers to operate in a battery save mode, the polarity of the preamble identifies the transmission mode single call or batch. For instance, when the preamble words are transmitted with one predetermined bit polarity, the single call mode is identified; if the preamble bits are inverted, the batch mode is indicated.

The control word activation code and address code all use a two word format consisting of 28 bits of comma followed by two (23, 12) code words. The comma is a 1, 0 bit reversal pattern transmitted at 600 bits/second. The two Golay code words (Word 1 and Word 2) are separated by a ½ bit space. The polarity of the ½ bit space shall be opposite the first bit of the second word and the starting comma bit must be of the same polarity as the first bit of the first word. The control word and activation code are predetermined for the preferred system. Word 2 of the control word and activation code are the inverses of the fixed words.

The address format is identical to the control word and activation code formats regarding the number of bits, the rules for comma and the ½ bit space. The address Word 2 may be chosen from any word of the (23, 12) code set except the all Ø's and all 1's combinations. Thus, there are 4094 potential second words made up of 12 information bits and 11 parity bits. The first words are chosen from a 100 word subset of the Golay code. To generate the binary bit patterns for the (23, 12) Golay code, the decimal representation of the code word is converted to binary. This binary representation is rewritten LSB to the left.

Tone only pages are those pager addresses which don't involve a voice message. Although the single cell mode can be used, the batch mode of operation is the preferred method of address transmission for tone only and tone and data pages. The activation code is generally not used in tone only paging, but it may be and an extended batch mode is especially useful in the high traffic periods.

The batch transmission format begins with an inverted preamble followed by the control word and up to 16 pager addresses or data blocks. The arriving page requests should be grouped as a function of preamble and transmitted on a time or traffic basis at the discretion of the terminal manufacturer and his customer.

It may be desirable to transmit more than 16 addresses within a single preamble batch. The extended batch mode is intended for these situations. The extended batch scheme extends the batch mode in multiples of 16 addresses without requiring the retransmission of the preamble. To accomplish this extension, the terminal need only send the control word. In theory, the batch could be extended indefinitely; however, a very slight degradation in pager sensitivity will occur with each extension.

The GSC format allows data pages to be intermixed with tone only or tone and voice pages. A data page consists of a pager address followed by one or more data blocks. A data block is identical in length to an address block and may be freely substituted for addresses in the batch operating mode. The single call mode can also be used by following the pager address with the data message. Data information is transmitted at 600 BPS to minimize the cross falsing probability between addresses and data.

Referring now to FIG. 1C the normal voice paging format involving a deactivation code of the preferred embodiment is shown on a time sequence basis beginning at the left hand side. A preamble signal is supplied for the purpose of designating a particular segment of the population of receivers. This is followed by a control word which in the preferred system is used for a function unrelated to the present invention. In sequence the address for the first designated pager is transmitted followed by an activation code whose function is to cause the addressed paper to immediately react to the reception of its address. Consistent with the normal alert time for voice systems there is an approximate two second gap during which time the addressed and activated pager provides a beep signal to alert the pager user that a voice message is about to be transmitted. At the conclusion of the alert time the variable length voice message is transmitted and at the conclusion of the variable length voice message the deactivation control word is transmitted to disable the audio channel for the addressed receiver.

The preamble for the next pager address is immediately transmitted followed by the appropriate control word and in sequence the address for the second pager the corresponding activation code. This is followed by the two second alert for the second addressed and activated pager after which time the corresponding voice variable length voice message for that second pager is transmitted. At the conclusion of the variable length message for the second addressed and activated pager there is the positive deactivation control word to shut down the audio operation of only the addressed and activated pager and allow further transmission of information for other pagers.

As may be seen for by comparison of FIGS. 1A, B, and C although the preferred embodiment includes additional signaling words to achieve other purposes the basic construction is identical to FIG. A in which case a variable length voice message is follwed by a deactivation control word which in the digital system allows for an immediate shut down of the audio channel and enables the entire message system to be utilized for the transmission of additional addresses and subsequent additional information so as to increase the throughput the overall message system.

FIG. 2 shows the decoder for a pager receiver according to the invention. A transmitted signal is received at the antenna input to a receiver 101 (a Motorola BPR 2000) The receiver 101 outputs an analog linear audio signal into a selector 103. The receiver 101 also outputs a digital or limited audio signal to echo chip 105. Echo chip 105 is an asynchronous internally clocked sequential digital word detector as described in U.S. Pat. No. 3,855,576 assigned to Motorola, Inc. Control logic 107 is preferrably a PLA for use in controlling the sequential logic of the decoder. Echo chip 105 outputs a detection signal to control logic 107 when a limited audio signal (digital signal) received by the echo chip 105 from receiver 101 correlates with a stored address in the echo chip 105 received from code plug 109. Code plug 109 is an expanded version of code plug 36 in U.S. Pat. No. 3,855,576 assigned to Motorola. Preferably the code plug 109 is a 8×6 PROM. Time clock 111 provides a time base for control logic 107 and echo chip 105. The time clock 111 also provides an audible tone signal to the B input of selector 103. Selector 103 enables either the analog linear audio signal (i.e. voice) at its A input or the digital audio tone at its B input. Which signal passes selector 103 is controlled by an output line from control logic 107. Amplifier 113 boost the signal enable by selector 103 and powers the speaker 115. The amp 113 is enabled or disabled in response to an output signal from control logic 107. Programmable timer 117 is loaded by control logic 107 to provide maximum time durations for certain sequential events.

Figure 3:
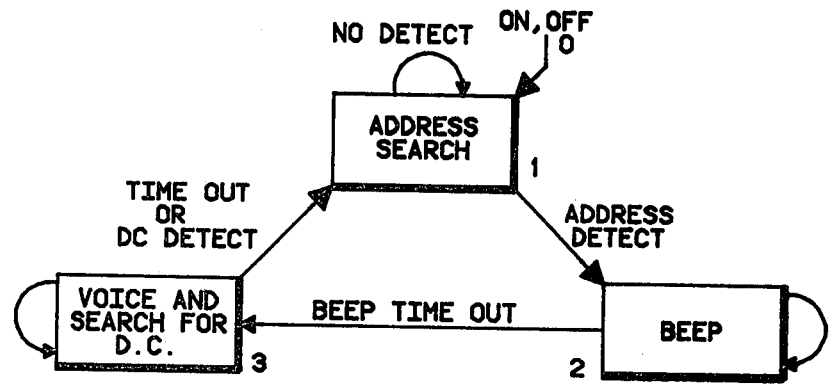
FIG. 3 is a state diagram representing the functions of the diagram of FIG. 2.

FIG. 3 is a state diagram of the pager shown in FIG. 2. After the pager decoder circuitry is turned on it enters a first state shown as state 1 in FIG. 3 and labeled address search. In this state the echo chip 105 is analyzing limited audio signals received from the receiver 101 and looking for correlation between the serially received limited audio signal and the pager's address code present on the output code plug 109. The code output of code plug 109 is determined by the code plug 109 input received from echo chip 105 output $A_0$ and $A_1$ together with control logic output $A_2$. Communication between echo chip 105 and code plug 109 is discussed in detail in U.S. Pat. No. 3,855,576. As shown by the first table accompanying FIG. 2 the echo chip 105 outputs $A_0$–$A_1$ determine which word half is present on the output of code plug 109. Output $A_2$ from control logic 107 determines whether that word half is the code for a pager address or the code for the deactivation word. The A input of the control logic 107 is waiting for a detection pulse from output AB of echo chip 105. Output E of control logic 107 has disabled amp 113. The S output of control logic 107, which controls the state of selector 103, is in an arbitrary state since amplifier 113 is off and no audio signal can reach the speaker 115. When the pager receives its address, the echo chip 105 correlates to address with the particular address code for the pager received from code plug 109. The echo chip 105 then outputs a detection signal on line AB which is inputed to input A of control logic 107. This detection causes a transition from state 1 (address search) to state 2 (beep) as shown in FIG. 3.

In state 2, the echo chip 105, after receiving the address of the pager from receiver 101, continues to process the limited audio signal received from receiver 101. But in state 2 the decoder is not interested in transmission received from the receiver 101. Therefore the control logic input A is not sensitive to the detection output AB of echo chip 105. Similarily the address of code plug 109 can be arbitrary since the decoder is not concerned about sensing a received limited audio signal at echo chip 105. The programmable counter 117 counts a beep period for which the output S of control logic 107 holds selector 103 in the B input position so that selector 103 transfers the 1.7 kilohertz signal to speaker 115 by way of amplifier 113 which is enabled by output E of control logic 107. The beep state preferrably lasts 2 seconds. Therefore the counter timer 117 is loaded with a binary count equivalent to a two second duration. At the end of this time (timeout) control logic 107 changes the state of the decoder to state 3 so that it is ready to receive a transmitted voice followed by a deactivation code.

Immediately after the control timer 117 has timed out the beep time, it's output S to selector 103 commands selector 103 to activate linear audio input A. Also control logic 107, through output E, enables amplifier 113. In anticipation of the two second audio tone time interval used to alert the operator when a pager has received its address, the remote encoder/transmitter will transmit the associated voice message approximately two seconds after the pager address has been transmitted. Therefore when the control logic 107 enables amplifier 113 two seconds after it receives the pager address, it should find the receiver 101 outputting an audio voice. The echo chip 105 is receiving a limited audio signal from receiver 101 and correlating that signal with the deactivation code address received from code plug 109. Echo chip 105 reads the address of the deactivation code by looking at one half of the address at a time, first by addressing $A_0$ and then by addressing a different part of the memory at $A_1$. The output of $A_2$ from control logic 107 tells the code plug 109 that the word to be outputted to the echo chip 105 is the deactivation code and not the pager's address code.

The decoder is now in state 3 and in proper operation echo chip 105 will receive a deactivation code at its limited audio input at the end of the voice transmission. Control logic 107 will receive a detection signal at input A from echo chip 105 which will return the decoder and the control logic 107 back to state 1 (address search) as shown in FIG. 3. Alternatively, if the deactivate code is not properly received the programmable timer 117 has been loaded with a maximum voice duration (approximately 16 seconds) which when timed out will return the control logic 107 and the pager to state 1 (address search).

Table I on the following page is a time sequential logic table of the PLA comprising the control logic 107 in accordance with the invention.

TABLE 1

LOGIC TABLE for PLA

| Inputs | | | | | | Outputs | | | |
|---|---|---|---|---|---|---|---|---|---|
| Control Timer | Present State | | Next State | | | | | | |
| A | (O) | $Q_1$ | $Q_0$ | $D_1$ | $D_0$ | E | S | $A_2$ | Programmable Timer Count |
| 0 | X | 0 | 0 | 0 | 0 | 0 | X | 1 | X |
| 1 | X | 0 | 0 | 0 | 1 | 0 | X | X | Beep Duration (2 sec.) |
| X | 0 | 0 | 1 | 0 | 1 | 1 | 0 | X | X |
| X | 1 | 0 | 1 | 1 | 0 | 1 | 0 | 0 | Control Word Search Duration (20 sec.) |
| 0 | 0 | 1 | 0 | 1 | 0 | 1 | 0 | 0 | X |
| 0 | 1 | 1 | 0 | 0 | 0 | 0 | X | 0 | X |
| 1 | 0 | 1 | 0 | 0 | 0 | 0 | X | 0 | X |
| 1 | 1 | 1 | 0 | 0 | 0 | 0 | X | 0 | X |

Figure 4:
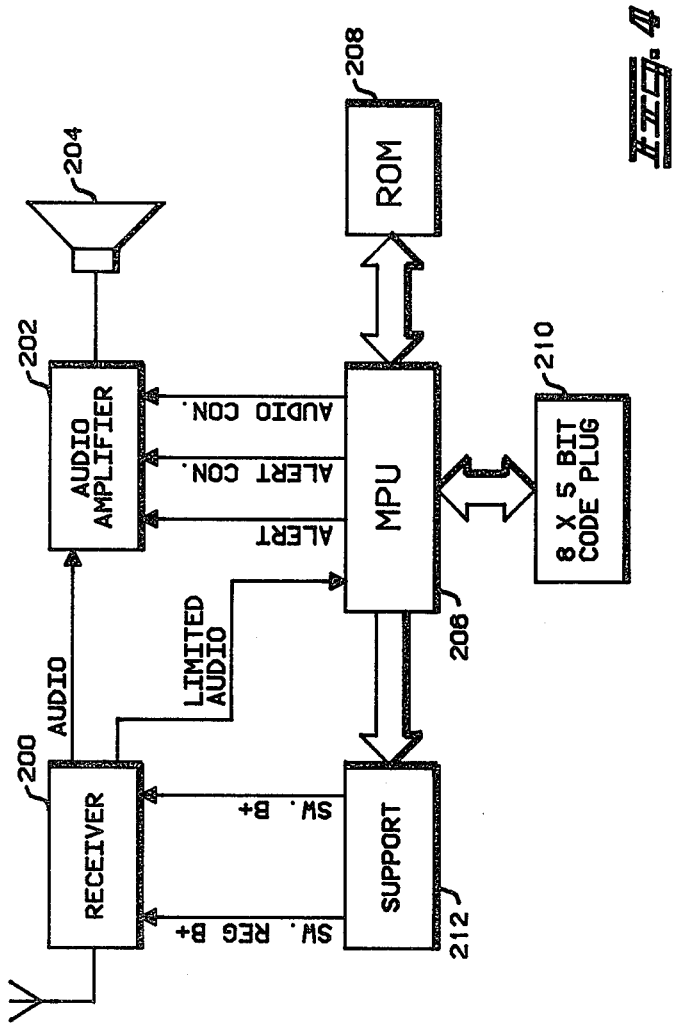
FIG. 4 is a functional block diagram of the firmware embodiment of the present invention.

FIG. 4 shows the receiver and the firmwear embodiment of the present invention. A receiver 200 receives a broadcast signal through an antenna and provides a demodulated audio signal to an audio amplifier 202. Audio amplifier 202 is coupled to an audio speaker 204. An additional output from receiver 200 is provided to a microprocessor 206 for the preferred embodiment is a 146805 microprocessor manufactured by Motorola, Inc. This additional connection from receiver 200 to microprocessor 206 is a limited audio signal which is used for correlation and decoding. Various ports on the microprocessor provide controls to audio amplifier 202 and these are labeled alert, alert control and audio control. A read-only memory 208 provides storage space for the firmwear operation of the microprocessor 206. A read-only memory 210 designated as a code plug provides address information for the individual receiver. Microprocessor 206 is coupled to and supplies signals to support circuitry 212 which, in turn, controls the switching of the regulated B+ and B+ signals to receiver 200.

Figure 5:
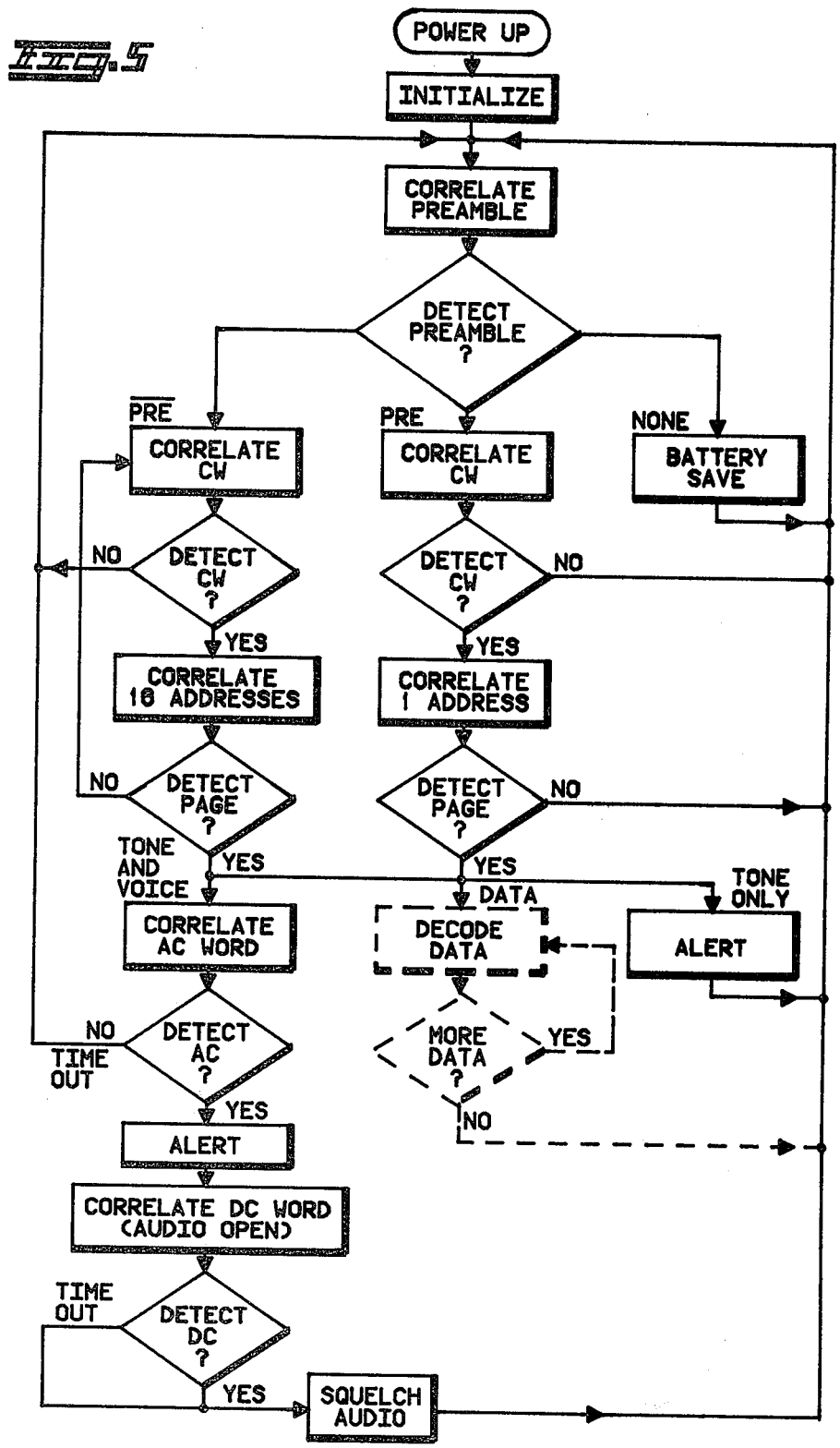
FIG. 5 is a flowchart for the firmware embodiment of the present invention.

FIG. 5 represents the flowchart for the firmwear operation of the microprocessor shown in FIG. 4. The operation of the decoder for the present invention commences with the detection of power up which occurs when the receiver is initially turned on.

During the power up and initialized operations, the microprocessor is made ready for its decoding operation. Part of that readying process includes activating the tone alert until it is reset or times out and in the case of tone and voice operation the audio channel is additionally activated until it is reset.

After initialization, the microprocessor is ready to receive information from the receiver and to decode the signals that are received. For the preferred embodiment these signals are digitally encoded words in a predetermined format of the Golay Sequential Code as described earlier. The correlate preamble detects the presence of a designated preamble word and is used to facilitate battery saving. If no preamble is detected, the pager goes to a battery save mode where the receiver unit is disabled for a specific time period. After that time, the receiver merely comes back on to again asynchronously correlate signals to determine if preamble is present. If preamble or preamble bar signals are detected, the next step is to decode for the presence of the control word signal.

The detection of a preamble signal will specify that the pager should look for one address whereas the preamble bar signal indicates that the pager will remain on for 16 addresses which constitutes a batch mode operation for the preferred embodiment. In either case, if the control word is not detected, the pager returns to the operation correlating for the presence of preamble.

For the occurrence of the preamble signal the receiver correlates the one address and determines whether or not a page has been detected. In this context, the detection of page means that the address from the correlator corresponds to an address which is in the address code plug. If the address is not in the code plug, the operation returns to correlating for preamble.

For the detection of preamble bar, if none of the 16 addresses in the batch correspond to an address which is in the address code memory for the receiver the operation is then returned to correlating for the control word. In this case, since it is already in a batch mode, the presence of a second control word may be used to indicate the continuation of the length of a batch. If the control word is not detected, then operation of the program is returned to correlating for preamble.

If a page is detected by the presence of a corresponding address in one of the possible 16 addresses in the batch, then the decision process depends on whether or not the message transmitted is a tone and voice message or a data message or a tone only message.

If it is a tone only message and the address has been detected, the alert operation may be actuated and after the alert has timed out or been reset, operation of the paging receiver is returned to correlating for preamble. The most comphrensive utilization of the activation and deactivation code signals occurs for the tone and noise description for the present decoder.

Although not part of the preferred decoder, in the event that data is detected as shown in phantom in the diagram, then a decode data operation would be initiated with an interrogation as to whether or not the data stream has concluded. In the event that there existed no more data, the decode data operation would be transferred back so that the device could then correlate for preamble.

For the tone and voice operation, if a page is detected that corresponds to a correct address decoding, the next step is to correlate the activation code word and the decision is then made whether or not the activation code word has indeed been detected. If the activation code is not detected during a predetermined time out period, then control is returned to correlate for preamble. The time out period in the preferred embodiment can be arbitrarily established depending upon what maximum number of concatenated addresses one wishes to have for the message system. If the activate code is detected, then the operations pager goes into the appropriate alert routine which times out after two seconds at which time the voice channel is actuated to that the voice message can be heard.

With the receiver in this mode with the audio channel open, the decoder operates to correlate for the deactivation code word to determine when the open audio should be positively closed. If no deactivation code is detected, there is a fixed time out period after which time the open channel is closed. After the squelching of audio, the decoder operation is returned to correlate for preamble.

Prior art automatically squelching receivers employed the detection of the presence or absence of the carrier signal to determine when the audio channel should be shut down. The advantage of the deactivation control signal word is that it affects only those pagers which have been correctly addressed and have received a message. The voice channel can then be appropriately shut down so as to prevent not only the annoying noise sound but to enable the time perod not utilized by the voice message to be utilized by additional addressing operations for the system. Individual messages may be of any length with the system resuming normal operations by adding additional addresses at the end of previous audio messages ended by the deactivation code.

Table 2 shows the hexadecimal core dump of the entire firmware coding program consistent with the language appropriate for the microprocessor shown in FIG. 4. Loading of this code into one appropriate ROM will provide the operation described by the flowchart in FIG. 5.

TABLE 2

| | | | | | | | | | | | | | | | | |
|---|---|---|---|---|---|---|---|---|---|---|---|---|---|---|---|---|
| 4800 | 9B | 3F | 00 | 3F | 04 | 3F | 01 | A6 | 6F | B7 | 05 | 02 | 00 | 5E | A6 | 0C |
| 4810 | B7 | 04 | A6 | 55 | AE | 10 | F7 | 5C | A3 | 80 | 26 | FA | 5A | F1 | 26 | FE |
| 4820 | A3 | 10 | 26 | F8 | 43 | 2B | EF | 27 | 03 | 4F | 20 | EA | 16 | 00 | AE | 7F |
| 4830 | 9C | 15 | 00 | A6 | 08 | 03 | 00 | FD | 01 | 00 | 11 | 08 | 00 | 00 | 76 | 14 |
| 4840 | 00 | 02 | 00 | FD | 15 | 00 | 4A | 26 | EC | 5A | 20 | E7 | 14 | 00 | 02 | 00 |
| 4850 | FD | 15 | 00 | 5C | FC | AE | 08 | 03 | 00 | FD | 17 | 00 | 46 | 24 | 02 | 16 |
| 4860 | 00 | 14 | 00 | 02 | 00 | FD | 15 | 00 | 5A | 26 | EC | 81 | 3F | 11 | 08 | 00 |
| 4870 | 09 | 10 | 11 | 3F | 23 | 0D | 00 | 02 | 1E | 23 | 1D | 00 | 1C | 04 | CD | 1E |
| 4880 | BC | A6 | 0B | B7 | 01 | 1D | 01 | 1D | 01 | A6 | 04 | B7 | 01 | 1D | 01 | 1D |
| 4890 | 01 | 3F | 01 | A6 | 0E | B7 | 01 | 1D | 01 | 1D | 01 | B6 | 00 | B7 | 10 | 1D |
| 48A0 | 10 | 04 | 10 | 05 | 02 | 10 | 02 | 1C | 10 | 1A | 10 | 5F | A6 | 01 | AD | 29 |
| 48B0 | A6 | 02 | AD | 25 | A6 | 05 | AD | 21 | A6 | 06 | AD | 1D | A6 | 09 | AD | 19 |
| 48C0 | A6 | 0A | AD | 15 | A6 | 0D | B7 | 01 | 1D | 01 | 1D | B6 | 00 | 46 | 36 |
| 48D0 | 51 | 34 | 51 | A4 | 0F | B7 | 53 | 20 | 1D | B7 | 01 | 1D | 01 | A6 | 02 | B7 |
| 48E0 | 13 | B6 | 00 | 46 | 36 | 51 | 46 | 25 | 02 | 1B | 10 | 66 | 55 | 46 | 66 | 55 |
| 48F0 | 5C | 3A | 13 | 26 | F1 | 81 | 1D | 11 | B6 | 51 | 44 | 24 | 02 | 1C | 11 | 97 |
| 4900 | D6 | 1F | 73 | B7 | 2E | 54 | D6 | 1F | A5 | 25 | 04 | 44 | 44 | 44 | 44 | A4 |
| 4910 | 0F | B7 | 32 | 0D | 11 | 04 | 33 | 2E | 33 | 32 | BE | 53 | D6 | 1F | BE | B7 |
| 4920 | 2D | D6 | 1F | C8 | B7 | 31 | 5F | 36 | 32 | 36 | 2E | 66 | 55 | 36 | 31 | 36 |
| 4930 | 2D | 66 | 55 | 5C | A3 | 0C | 25 | EF | 5F | E6 | 55 | E8 | 56 | E8 | 57 | E8 |
| 4940 | 58 | F8 | 59 | E8 | 5C | E8 | 5F | E7 | 61 | 5C | A3 | 0B | 25 | EB | 5F | E5 |
| 4950 | 55 | 5C | BF | 14 | 5F | 49 | 66 | 2D | 66 | 31 | 66 | 35 | 5C | A3 | 04 | 25 |
| 4960 | F4 | BE | 14 | A3 | 17 | 25 | E8 | 09 | 01 | 0D | AE | 03 | 63 | 2D | 63 | 31 |
| 4970 | 63 | 35 | 5A | A3 | 01 | 26 | F5 | 00 | 11 | 03 | CC | 1A | EE | A6 | 0F | B7 |
| 4980 | 01 | 3F | 1F | 04 | 10 | 03 | 02 | 10 | 06 | 1F | 10 | A6 | 04 | 20 | 08 | 1E |
| 4990 | 10 | 3C | 1F | 14 | 11 | A6 | 30 | B7 | 20 | CC | 1D | 55 | 1F | 22 | A6 | 19 |
| 49A0 | B7 | 1D | BE | 1E | D6 | 1F | DE | B7 | 13 | D6 | 1F | E5 | B7 | 14 | D6 | 1F |
| 49B0 | EC | B7 | 12 | A3 | 00 | 27 | 1D | 5A | A3 | 02 | 25 | 1D | 5A | 5A | 9D | 21 |
| 49C0 | 02 | 1E | 22 | D6 | 1F | D2 | B7 | 17 | D6 | 1F | D6 | B7 | 18 | D6 | 1F | DA |
| 49D0 | B7 | 19 | 20 | 18 | 1E | 22 | 9D | 20 | 02 | AE | 01 | A6 | 03 | 4A | 26 | FD |
| 49E0 | E6 | 2D | B7 | 17 | E6 | 31 | B7 | 18 | E6 | 35 | B7 | 19 | 08 | 01 | 07 | 17 |
| 49F0 | 01 | 17 | 01 | 9D | 20 | 06 | 33 | 17 | 33 | 18 | 33 | 19 | A6 | 0D | B7 | 28 |
| 4A00 | AE | 03 | 9F | 4C | A4 | 03 | B7 | 1A | 97 | 17 | 01 | 0E | 00 | 00 | 66 | 39 |
| 4A10 | 66 | 3D | 66 | 41 | 0F | 12 | 6C | E6 | 39 | B8 | 17 | B7 | 15 | E6 | 3D | B8 |
| 4A20 | 18 | B7 | 16 | E6 | 41 | B8 | 19 | 44 | 97 | D6 | 1E | F3 | BE | 16 | 54 | D9 |
| 4A30 | 1E | F3 | BE | 15 | 54 | D9 | 1E | F3 | BE | 1A | E7 | 25 | B6 | 25 | BB | 26 |
| 4A40 | BB | 27 | BB | 28 | A1 | 0C | 22 | 03 | CC | 1A | FF | 0E | 22 | 03 | 9D | 20 |
| 4A50 | 07 | A1 | 50 | 25 | 03 | CC | 1B | 0B | 0E | 01 | 07 | 3A | 1D | 26 | 08 | CC |
| 4A60 | 1E | 6A | A6 | 19 | B7 | 1D | 9D | B6 | 1E | A1 | 01 | 27 | 3E | 3A | 13 | 26 |
| 4A70 | 3E | 3A | 14 | 27 | 3E | BE | 1E | D6 | 1F | DE | B7 | 13 | BE | 1A | 21 | E7 |
| 4A80 | CC | 1A | 02 | 3A | 12 | 27 | 03 | 9D | 20 | 02 | 1E | 12 | 0E | 01 | 07 | 3A |
| 4A90 | 1D | 26 | 08 | CC | 1E | 6A | A6 | 19 | B7 | 1D | 9D | A6 | 11 | 4A | 26 | FD |
| 4AA0 | 9D | 16 | 01 | A6 | 02 | 4A | 26 | FD | CC | 1A | 02 | 9D | 9D | 9D | 9D | 9D |
| 4AB0 | 9D | 20 | EE | BE | 1E | 26 | 12 | A6 | 04 | B7 | 01 | A6 | 02 | 4A | 26 | FD |
| 4AC0 | 3F | 01 | A6 | 0C | B7 | 13 | CC | 1B | B4 | 5A | 27 | 22 | 5A | 26 | 1B | 3A |
| 4AD0 | 24 | 27 | 08 | A6 | 02 | B7 | 1E | 9D | 9D | 20 | 0C | 0C | 22 | 04 | 3F | 1E |
| 4AE0 | 20 | 05 | A6 | 03 | B7 | 1F | 9D | CC | 1B | 59 | A3 | 04 | 27 | 0C | 3F | 01 |
| 4AF0 | 3F | 1E | 08 | 10 | 02 | 3C | 1E | CC | 19 | 9C | 3F | 01 | CC | 1E | A0 | BE |
| 4B00 | 1E | 26 | 21 | 9D | 9D | 0A | 1D | 22 | 20 | 06 | BE | 1E | 26 | 08 | 1C |
| 4B10 | 22 | A6 | 04 | B7 | 1E | 20 | E0 | 5A | 5A | 5A | A3 | 02 | 24 | 1A | A6 | 02 |
| 4B20 | B7 | 1E | 20 | 20 | 5A | A3 | 02 | 24 | 03 | CC | 1B | C8 | 5A | 5A | A3 | 02 |
| 4B30 | 24 | 06 | A6 | 02 | B7 | 1E | 20 | 07 | 5A | 5A | 26 | BE | CC | 1D | 55 | 9D |
| 4B40 | AE | 93 | 20 | 02 | AE | 35 | 0C | 22 | 04 | A6 | 01 | 20 | 04 | A6 | 10 | 21 |
| 4B50 | FC | B7 | 24 | 9D | 9D | A6 | 0B | 20 | 0D | AE | 91 | 9D | A6 | 05 | 20 | 04 |
| 4B60 | AE | 1F | A6 | 1E | 17 | 01 | BF | 13 | 4A | 26 | FD | 0E | 01 | 07 | 3A | 1D |
| 4B70 | 26 | 08 | CC | 1E | 6A | A6 | 19 | B7 | 1D | 9D | CD | 1E | B5 | 3A | 13 | 26 |
| 4B80 | EA | CC | 19 | 9C | 9C | CD | 1E | BC | 0E | 01 | 09 | A6 | 0F | B7 | 01 | AD |
| 4B90 | 2C | CC | 1E | 6A | 3A | 13 | B6 | 13 | A1 | 02 | 24 | 18 | A6 | 0F | B7 | 01 |
| 4BA0 | A6 | 02 | 4A | 26 | FD | 3F | 01 | B6 | 13 | 26 | 09 | AD | 10 | AD | 0E | 3F |
| 4BB0 | 1E | CC | 19 | 9C | A6 | B6 | B7 | 08 | A6 | 0F | B7 | 09 | 8F | AE | 06 | A6 |
| 4BC0 | A5 | 4A | 26 | FD | 5A | 26 | F8 | 81 | A6 | 61 | B7 | 13 | A6 | 03 | B7 | 1A |
| 4BD0 | A6 | 05 | 4A | 26 | FD | 9D | CD | 1D | 1D | B6 | 13 | A1 | 05 | 22 | 0C | E6 |

TABLE 2-continued

| | | | | | | | | | | | | | | | |
|---|---|---|---|---|---|---|---|---|---|---|---|---|---|---|---|
| 4BE0 | 39 | 49 | 36 | 1C | 1D | 01 | 1D | 01 | 9D | 20 | 0C | E6 | 39 | E7 | 45 | E6 |
| 4BF0 | 3D | E7 | 49 | E6 | 41 | E7 | 4D | 3A | 13 | 27 | 08 | CD | 1E | AE | CD | 1D |
| 4C00 | 10 | 20 | D3 | 3F | 1B | A6 | 03 | B7 | 13 | 36 | 1C | 4A | 26 | FB | CD | 1D |
| 4C10 | 05 | 1E | 11 | 12 | 11 | 0F | 11 | 05 | A6 | 04 | 9D | 20 | 04 | 3A | 1B | A6 |
| 4C20 | 01 | B7 | 14 | CD | 1D | 1D | A6 | 08 | 4A | 26 | FD | 9D | B6 | 1B | 4C | A4 |
| 4C30 | 03 | B7 | 1B | 97 | E6 | 45 | B8 | 17 | 37 | 15 | E6 | 49 | B8 | 18 | B7 | 16 |
| 4C40 | E6 | 4D | B8 | 19 | 44 | 97 | D6 | 1E | F3 | BE | 16 | 54 | D9 | 1E | F3 | BE |
| 4C50 | 15 | 54 | D9 | 1E | F3 | BE | 1B | 02 | 11 | 04 | E7 | 29 | 20 | 04 | E7 | 25 |
| 4C60 | 21 | FC | 3A | 14 | 26 | BD | CD | 1D | 1D | 03 | 11 | 32 | B6 | 25 | BB | 26 |
| 4C70 | BB | 27 | BB | 28 | A1 | 0C | 22 | 02 | 20 | 3A | 01 | 10 | 03 | 9D | 20 | 08 |
| 4C80 | A1 | 50 | 25 | 04 | 15 | 11 | 20 | 2E | B6 | 30 | B7 | 17 | B6 | 34 | B7 | 18 |
| 4C90 | B6 | 38 | B7 | 19 | A6 | 0C | 4A | 26 | FD | 13 | 11 | CC | 1C | 15 | 0B | 10 |
| 4CA0 | 07 | A6 | 02 | 4A | 26 | FD | 20 | 11 | B6 | 29 | BB | 2A | BB | 2B | BB | 2C |
| 4CB0 | A1 | 0C | 22 | 05 | 14 | 11 | CC | 1D | 2F | CD | 1D | 10 | 1F | 11 | 3A | 13 |
| 4CC0 | 27 | 0F | 12 | 11 | 3C | 1B | CD | 1D | 05 | 1D | 01 | 9D | 9D | 9D | CC | 1C |
| 4CD0 | 15 | A6 | 07 | 4A | 9D | 9D | 26 | FB | A6 | 02 | B7 | 1E | CD | 1D | 1D | 08 |
| 4CE0 | 10 | 0A | 1D | 01 | 1D | 01 | 9D | 3A | 1E | CC | 19 | 9C | 3A | 24 | 27 | 06 |
| 4CF0 | 1D | 01 | 1D | 01 | 20 | 0C | 0C | 22 | 04 | 3F | 1E | 20 | 05 | A6 | 03 | B7 |
| 4D00 | 1E | 9D | CC | 1B | 60 | BE | 1B | 36 | 1C | 66 | 45 | 66 | 49 | 66 | 4D | 81 |
| 4D10 | B6 | 2F | B7 | 17 | B6 | 33 | B7 | 18 | B6 | 37 | B7 | 19 | 81 | B6 | 1A | 4C |
| 4D20 | A4 | 03 | B7 | 1A | 97 | 0E | 00 | 00 | 66 | 39 | 66 | 3D | 66 | 41 | 81 | 3F |
| 4D30 | 1F | 03 | 11 | 02 | 3C | 1F | 04 | 10 | 06 | 05 | 11 | 13 | 0D | 10 | 10 | A6 |
| 4D40 | 20 | B7 | 20 | 1F | 10 | 0A | 00 | 0D | A6 | 05 | B7 | 1E | CC | 19 | 9C | A6 |
| 4D50 | 80 | B7 | 20 | 1E | 10 | A6 | 04 | 20 | 0C | A6 | 0C | B7 | 20 | 1F | 10 | A6 |
| 4D60 | 02 | B7 | 1F | A6 | 0C | B7 | 22 | A6 | 60 | B7 | 01 | A6 | 19 | B7 | 1D | A6 |
| 4D70 | 7D | B7 | 21 | 09 | 22 | 03 | 9D | 20 | 02 | 1C | 00 | 17 | 01 | 05 | 22 | 04 |
| 4D80 | A6 | 05 | 20 | 04 | 21 | FE | A6 | 10 | 4A | 26 | FD | 9D | 9D | 1D | 00 | 3A |
| 4D90 | 21 | 26 | 6C | 3A | 20 | 26 | 0F | 07 | 22 | 05 | 1C | 23 | CC | 18 | 93 | 07 |
| 4DA0 | 11 | 01 | 81 | CC | 1E | 2C | 3A | 1F | 27 | 12 | 04 | 22 | 06 | 21 | 04 | A6 |
| 4DB0 | 0A | 20 | 02 | A6 | 01 | 4A | 26 | FD | 9D | 9D | 20 | B3 | 3C | 1F | A6 | 7D |
| 4DC0 | B7 | 21 | 07 | 22 | 16 | 05 | 22 | 05 | 15 | 22 | 9D | 20 | AC | 14 | 22 | A6 |
| 4DD0 | 08 | 4A | 26 | FD | 17 | 01 | 9D | 3C | 1F | 20 | 9E | 08 | 22 | 04 | 18 | 22 |
| 4DE0 | 20 | 9E | 19 | 22 | 21 | FC | 05 | 11 | 03 | 9D | 20 | 0B | 02 | 22 | 08 | 12 |
| 4DF0 | 22 | A6 | 05 | B7 | 1F | 20 | 82 | 13 | 22 | 9D | 9D | 9D | CC | 1D | 79 | 0E |
| 4E00 | 10 | 0E | 04 | 22 | 07 | A6 | 09 | 4A | 26 | FD | 9D | 9D | 17 | 01 | 20 | 11 |
| 4E10 | 0E | 01 | 09 | 3A | 1D | 26 | 0A | 1D | 10 | CC | 1E | 6C | A6 | 19 | B7 | 1D |
| 4E20 | 9D | 16 | 01 | 9D | A6 | 02 | 4A | 26 | FD | CC | 1D | 73 | 1B | 01 | 0F | 10 |
| 4E30 | 07 | 1D | 01 | 11 | 11 | CC | 1E | A0 | 01 | 11 | 04 | 11 | 11 | 20 | 15 | 0C |
| 4E40 | 10 | 08 | 02 | 10 | 05 | 1D | 01 | CC | 18 | 93 | 06 | 10 | 07 | A6 | 06 | B7 |
| 4E50 | 1E | CC | 19 | 9C | A6 | 19 | B7 | 1D | 0E | 01 | 07 | 3A | 1D | 26 | 07 | CC |
| 4E60 | 1E | 6C | A6 | 19 | B7 | 1D | AD | 4D | 20 | FE | 16 | 11 | A6 | 19 | B7 | 1D |
| 4E70 | 11 | 11 | 3F | 01 | 1D | 00 | 04 | 10 | 17 | 0C | 10 | 14 | 07 | 11 | 0B | 3F |
| 4E80 | 1F | A6 | 01 | B7 | 20 | 1F | 10 | CD | 1D | 55 | AD | 3A | 16 | 11 | 20 | 04 |
| 4E90 | 17 | 11 | 1C | 01 | 0F | 01 | 0F | 3A | 1D | 26 | 0F | 1D | 01 | 06 | 11 | 02 |
| 4EA0 | AD | 24 | 17 | 11 | 20 | 41 | A6 | 19 | B7 | 1D | AD | 09 | 20 | E6 | 9D | 1D |
| 4EB0 | 01 | 1D | 01 | 20 | 05 | A6 | 14 | 4A | 26 | FD | 21 | FE | 16 | 01 | A6 | 05 |
| 4EC0 | 4A | 26 | FD | 17 | 01 | 81 | A6 | 0C | B7 | 01 | A6 | C8 | 4A | 26 | FD | 18 |
| 4ED0 | 11 | 0C | 23 | 10 | A6 | 03 | 5F | 08 | 00 | 01 | 5C | 4A | 26 | F9 | A3 | 01 |
| 4EE0 | 22 | 02 | 19 | 11 | 3F | 01 | 81 | 0F | 23 | 06 | 09 | 11 | 03 | CC | 1D | 59 |
| 4EF0 | CC | 18 | 93 | 00 | 01 | 01 | 02 | 01 | 02 | 02 | 03 | 01 | 02 | 02 | 03 | 02 |
| 4F00 | 03 | 03 | 04 | 01 | 02 | 02 | 03 | 02 | 03 | 03 | 04 | 02 | 03 | 03 | 04 | 03 |
| 4F10 | 04 | 04 | 05 | 01 | 02 | 02 | 03 | 02 | 03 | 03 | 04 | 02 | 03 | 03 | 04 | 03 |
| 4F20 | 04 | 04 | 05 | 02 | 03 | 03 | 04 | 03 | 04 | 04 | 05 | 03 | 04 | 04 | 05 | 04 |
| 4F30 | 05 | 05 | 06 | 01 | 02 | 02 | 03 | 02 | 03 | 03 | 04 | 02 | 03 | 03 | 04 | 03 |
| 4F40 | 04 | 04 | 05 | 02 | 03 | 03 | 04 | 03 | 04 | 04 | 05 | 03 | 04 | 04 | 05 | 04 |
| 4F50 | 05 | 05 | 06 | 02 | 03 | 03 | 04 | 03 | 04 | 04 | 05 | 03 | 04 | 04 | 05 | 04 |
| 4F60 | 05 | 05 | 06 | 03 | 04 | 04 | 05 | 04 | 05 | 05 | 06 | 04 | 05 | 05 | 06 | 05 |
| 4F70 | 06 | 06 | 07 | 11 | AB | 88 | 6B | 2A | AC | 5A | D3 | 14 | 60 | 84 | B8 | 83 |
| 4F80 | D8 | E0 | 60 | 68 | 0B | 6C | 34 | ED | 30 | 83 | 64 | 39 | 4C | 07 | 38 | 6F |
| 4F90 | 90 | 77 | D0 | 08 | 30 | 98 | 37 | 3B | 72 | 8C | C3 | 27 | 87 | 50 | 0C | E4 |
| 4FA0 | 20 | 10 | 43 | A0 | A0 | 2A | B5 | A6 | A5 | A2 | 6F | DD | 5E | 3C | 8A |
| 4FB0 | 3E | C8 | 5A | 6C | 14 | B7 | 1C | D3 | DC | 6D | CA | 4A | 63 | 50 | EE | 5C |
| 4FC0 | 7E | 87 | BF | F3 | 9D | EC | 18 | 1F | 07 | 06 | 0C | 02 | 00 | 0C | 07 | 09 |
| 4FD0 | 06 | 09 | 40 | 40 | 20 | 20 | 65 | 65 | 94 | 94 | 92 | 92 | 06 | 06 | 60 | 01 |
| 4FE0 | 08 | 66 | AC | F4 | F4 | 01 | 01 | 01 | 01 | 0A | 62 | 62 | 58 | 80 | 58 | 58 |
| 4FF0 | 58 | 58 | 58 | 00 | 00 | 00 | 1B | 84 | 1B | 84 | 18 | 00 | 18 | 00 | 18 | 00 |

We claim:

1. A decoder for a receiver in a plural population of receivers, each said receiver having a predetermined alert sequence and an audio circuit, for receiving transmitted coded information including activation code signals, comprising:
   means responsive to received coded signals which designate the address of at least one receiver in said plural population of receivers;
   means responsive to the detection and decoding of an address of said receiver for establishing a ready state of said receiver to receive additional information of selectively variable length, subsequent to said received coded signals which designate the address;
   means responsive to deactivation code signals immediately after the end of said information of selectively variable length which causes said receiver to terminate processing of said information.

2. A decoder, according to claim 1, wherein:
   said means responsive to said deactivation code signals deactivates said audio circuit upon receipt of a deactivation code signal.

3. A decoder, according to claim 1, further comprising:
means responsive to a first activation code signal for enabling said receiver to respond to subsequent information.

4. A decoder, according to claim 2, wherein:
said means responsive to a first activation code signal activates said predetermined alert sequence upon receipt of said firt activation code signal.

5. A decoder, according to claim 1, further comprising:
means responsive to a first set of received coded signals for selecting one of at least a first and second time period for said receiver to detect and decode received address coded signals;
timer means, responsive to said selecting means, for timing said first and second time periods.

6. A decoder, according to claim 3, further comprising:
means responsive to a first set of received coded signals for selecting one of at least a first and second time period for said receiver to detect and decode received address coded signals;
timer means, responsive to said selecting means, for timing said first and second time periods.

7. A decoder, according to claim 5, wherein:
said first set of received coded signals includes one of a preamble and an inverted preamble, said selecting means selects said first time period in response to said first set of received coded signals having a preamble and selects said second time period in response to said first set of received coded signals having an inverted preamble.

8. A decoder, according to claim 6, wherein:
said first set of received coded signals includes one of a preamble and an inverted preamble, said selecting means selects said first time period in response to said first set of received coded signals having a preamble and selects said second time period in response to said first set of received coded signals having an inverted preamble.

9. A decoder, according to claim 3, wherein:
said means responsive to said deactivation code signals terminates processing of said information of selectively variable length upon receipt of a second activation code signal.

10. A decoder, according to claim 6, wherein:
said means responsive to said deactivation code signals terminates processing of said information of selectively variable length upon receipt of a second activation code signal.

11. A decoder, according to claim 9, wherein:
said means responsive to said deactivation code signals deactivates said audio circuit upon receipt of said second activation code signal.

12. A decoder, according to claim 10, wherein:
said means responsive to said deactivation code signals deactivates said audio circuit upon receipt of said second activation code signal.

13. A decoder for a receiver in a plural population of receivers, each said receiver having a predetermined alert sequence, for receiving transmitted coded information including activation code signals, comprising:
receiver means, for receiving said transmitted coded information including said activation code signals;
audio circuit means, for generating an audio signal;
control means, connected to said receiver means and said audio circuit means, for decoding and detecting received coded signals which designate the address of at least one said receiver in said plural population of receivers for one of at least a first and a second time period, for activating said predetermined alert sequence upon receipt of a first activation code signal, and for deactivating said audio circuit means upon receipt of a second activation signal, in acordance with said received transmitted coded information.

14. A decoder, according to claim 13 wherein said control means comprises:
a digital word detector and memory, connected to said receiver means, for receiving digital signals from said receiver and correlating said digital signals with information at a stored address from said memory;
a selector circuit, connected to said receiver means and said audio circuit means, for selecting the output of said audio circuit means;
a control logic circuit, connected to said digital word detector and memory, said selector circuit and said receiver means, for controlling the output of said receiver means, selector means and audio circuit means, said control logic circuit including a programmable timer for timing said at least first and second time periods; and,
a timer clock, connected to said selector circuit, said digital word detector and said control logic circuit, for providing a time base.

15. A decoder, according to claim 13, wherein said control means comprises:
a microprocessor, connected to said receiving means, for processing said received transmitted coded information;
a read-only memory, connected to said microprocessor, for storing information for use by said microprocessor;
a code plug, connected to said microprocessor for storing address information pertaining to said receiver; and
a support circuit, connected to said microprocessor means and said receiver means, for controlling the switching of said receiver means.

16. A method of decoding encoded signals including activation signals, for transmitting information to a receiver in a plural population of receivers, each said receiver having a predetermined alert sequence and an audio circuit, comprising the steps of:
detecting and decoding received address signals;
correlating the received address signals with predetermined address information contained within said receiver;
producing a control signal when said received address signals correspond to said predetermined address information;
detecting and decoding deactivation code signals subsequent to said control signal for disabling said receiver from responding to said information.

17. A method of decoding encoded signals, according to claim 16, wherein said step of detecting and decoding deactivation code signals further includes the step of:
deactivating said audio circuit upon receipt of said deactivation code signal.

18. A method of decoding encoded signals, according to claim 16, further comprising the steps of:
detecting and decoding first activation code signals, prior to detecting and decoding said deactivation code signals, for enabling said receiver to respond.

19. A method of decoding encoded signals, according to claim 18, wherein said step of detecting and decoding first activation code signals includes the step of:

activating said predetermined alert sequence upon receipt of said first activation code signal.

20. A method of decoding encoded signals, according to claim 16, further comprising the steps of:

detecting and decoding a first set of received coded signals and selecting one of at least a first and a second time period for detecting and decoding received address coded signals by said receiver in response to said first set of received coded signals, prior to of detecting and decoding received address signals.

21. A method of decoding encoded signals, according to claim 18, further comprising the step of:

detecting and decoding a first set of received coded signal and selecting one of at least a first and a second time period for detecting and decoding received address coded signals by said receiver in response to said first set of recieved coded signals, prior to said step of detecting and decoding received address signals.

22. A method of decoding encoded signals, according to claim 18, wherein the step of detecting and decoding deactivation code signals includes the step of:

detecting and decoding a second activation code signal and terminating the processing of said transmitted information signals upon detection of said second activation code signal.

23. A method of decoding encoded signals, according to claim 21, wherein the step of detecting and decoding deactivation code signals further comprises a step of:

detecting and decoding a second activation code signal and terminating the processing of said transmitted information signals upon detection of said second activation code signal.

24. A method of decoding encoded signals, according to claim 22, wherein the step of detecting and decoding a second activation code signal further comprising the step of:

deactivating said audio circuit upon receiving said second activation code signal.

25. A method of decoding encoded signals, according to claim 23, wherein the step of detecting and decoding a second activation code signal, further comprises the step of:

deactivating said audio circuit upon receiving said second activation code signal.

* * * * *